July 30, 1935.  A. J. BRAUER  2,009,472
MEASURING SHOE PARTS
Filed Jan. 9, 1933
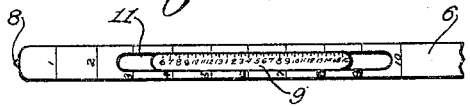
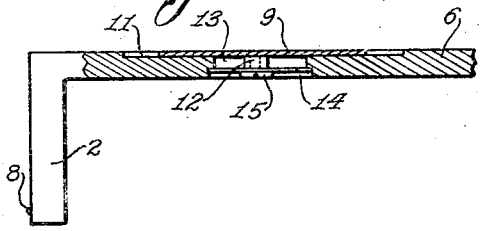
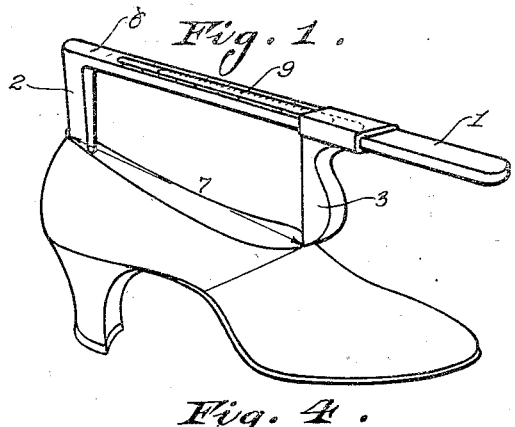
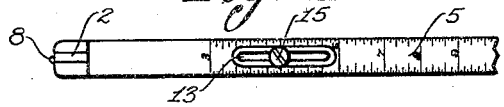
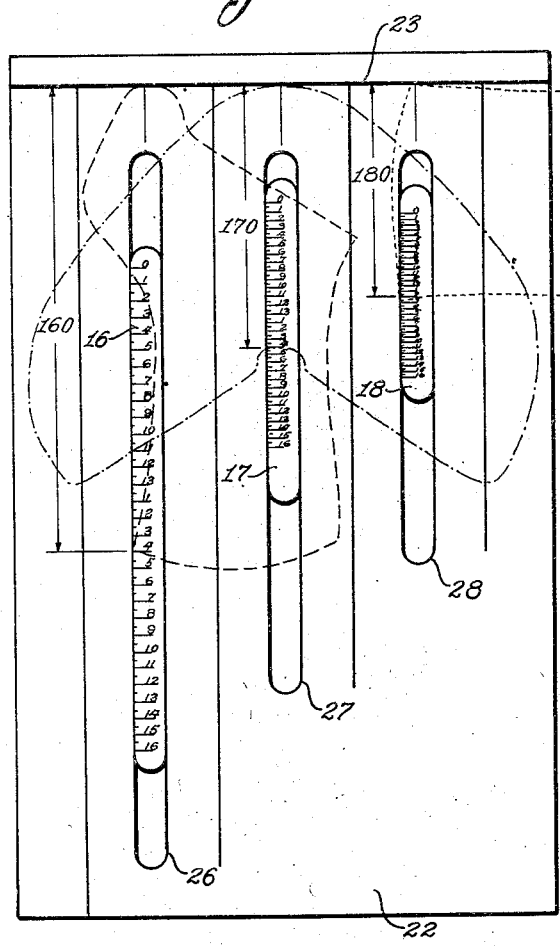
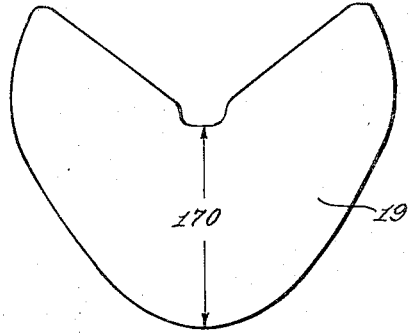
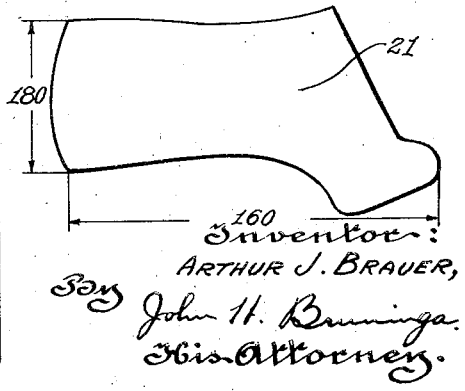
Inventor:
ARTHUR J. BRAUER,
By John H. Bruninga
His Attorney.

Patented July 30, 1935

2,009,472

UNITED STATES PATENT OFFICE 2,009,472

MEASURING SHOE PARTS

Arthur J. Brauer, St. Louis, Mo., assignor to Brauer Bros. Inc., St. Louis, Mo., a corporation of Missouri Application January 9, 1933, Serial No. 650,938

2 Claims. (Cl. 33—3)

This invention relates generally to apparatus for measuring shoes and shoe parts, as well as lasts and particularly to apparatus particularly adapted for checking the gradation of shoes, shoe parts and lasts of different sizes.

It has heretofore been difficult, if not impossible for shoe dealers or even shoe manufacturers to check the gradation of the various shoes of a particular lot and to determine with accuracy whether or not the dimensions of the shoes or shoe parts were properly graded over a range of sizes. The various dimensions of shoes, shoe parts and lasts vary with definite increments per size while the style or type of shoe remains the same. While the increment of a particular dimension is the same as between all sizes and regardless of the style or type of shoe, the actual dimensions of the parts may vary for the different styles or types as, for instance the overall or stick length of women's oxfords, size 4, may be different from the overall or stick length of women's pumps of the same size, and particularly is this true when the shoes are of different manufacture. Of course, the dimensions of size 4 boys' shoes differ from size 4 women's shoes. As between sizes of the same style and type, however, there are definitely established gradations or increments in dimensions. These increments are, however, not matters of common knowledge, and, although those who were acquainted with such increments have been able heretofore, as by means of an ordinary foot rule or measuring stick graduated in inches or any other standard of length to determine, after some considerable computation, whether or not the gradation of a particular lot of shoes was accurate and proper. It is apparent that the difficulties of this operation have been such as to deter, if not preclude this practice and accordingly many shoe manufacturers have not strictly observed and abided by the conventional gradations. This has resulted in ill-fitting shoes.

It is among the objects of the present invention to provide a measuring device by the use of which the accuracy of gradation of shoes of various sizes may be readily compared and checked.

Another object of this invention is to provide a shoe or shoe part measuring device graduated in size increments of particular shoe parts.

A further object of this invention is to provide a measuring device for shoes or shoe parts wherein the dimensions of the same style and type shoe may be readily and accurately compared regardless of the size.

A more specific object of this invention is to provide a measuring device for shoes, shoe parts or lasts wherein a scale graduated in size increments of a particular dimension may be initially set in accordance with the dimensions of an actual shoe or shoe part and in that position employed for determining the accuracy of gradation of other shoes and shoe parts of the same and different sizes.

Other objects will become apparent to those skilled in the art when the following description is read in connection with the accompanying drawing, in which:

Figure 1 is a perspective view of a shoe showing a shoe measuring stick embodying the features of the present invention in position thereon.

Figure 2 is a detail plan view of a portion of the stick of Figure 1 and showing the scale of the present invention.

Figure 3 is a sectional view in side elevation of the stick shown in Figure 2.

Figure 4 is a bottom plan view of the stick shown in Figure 2.

Figure 5 is a plan view of a typical vamp pattern.

Figure 6 is a plan view of a typical quarter pattern.

Figure 7 is a plan view of a measuring or grading board embodying a plurality of scales constructed and arranged in accordance with the present invention and each devised for measuring a different shoe dimension.

In accordance with the usual practice the length of shoes of any type and style varies $\frac{1}{3}''$ per size. Similarly, the vamp length of a shoe varies $\frac{1}{8}''$ per size, while the overall length of a quarter varies $\frac{1}{24}''$ per size, and likewise with the length of the opening. The so-called back heel height, which is the transverse dimension of a quarter, varies $\frac{1}{16}''$ per whole size. The above size increments are universally recognized as conventional and apply to shoes of all types and sizes, as well as, of course, to lasts, shoe parts and patterns therefor.

The present invention contemplates a measuring device which may be employed to readily check the gradation of shoe parts, shoes, patterns and lasts, as well as to check the coordination of the respective shoe parts with corresponding points on a last while the shoe is in the course of manufacture and while still on the last.

In accordance with the present invention, generally stated, a shoe measuring or grading device is provided wherein there is employed a scale, the graduations of which are spaced apart a distance corresponding to the size or half size increment in the particular shoe or shoe part dimension which the device is intended to measure. For instance, in a device for measuring or comparing the opening lengths of shoes, the scale of the present invention will be understood to be graduated in major graduations $\tfrac{5}{24}''$ apart, it being understood, of course, that minor graduations representing half sizes may occur half way between the major graduations. Likewise, the scale of a vamp measuring device will have major graduations $\tfrac{1}{8}''$ apart, and minor graduations therebetween, etc. More particularly, the present invention contemplates a measuring device having a head or abutment adjacent one end of a suitable blade and movably mounted along the blade may be a scale graduated in suitable size increments, the distance between the graduations depending upon the particular dimension of a shoe or shoe part which the device is adapted to measure. It will be understood, of course, that the scales may be made interchangeable so that a device may be adapted, by simply changing the scale, to measure more than one shoe dimension. Likewise, a plurality of scales may be provided on the same blade, or the blade may be wide, in the form of a board, to accommodate a plurality of scales.

With a measuring device constructed generally as just described, it is apparent that when a particular lot of shoes, shoe parts or patterns is received by a dealer or manufacturer and he desires to check the gradations of the parts, a shoe or part of any size may be selected and the scale moved along the blade until the graduation appropriate to the size selected is properly disposed. Any other size may then be selected from the lot and placed upon the measuring device, and if properly graded, will correspond with the graduation indicating that size.

Referring now particularly to the drawing, there is illustrated in Figure 1, an ordinary shoe measuring stick which has been provided with a scale arranged in accordance with the present invention. Such a shoe measuring stick ordinarily comprises a blade 1, having a stationary head or abutment 2 and a slidable head or abutment 3. A shoe or last may be positioned between the inside surfaces of heads 2 and 3 so as to measure the overall length, that is, from the back to the toe, by means of a suitable scale 5, generally positioned on the inside of the stick and illustrated in Figure 4. This may be in inches and suitable subdivisions thereof. Likewise, there may be provided a scale 6 on the outside of blade 1, and shown particularly in Figure 2, for measuring the length of the opening, which dimension is illustrated as 7 in Figure 1, when the stick is in the position there illustrated. In order to facilitate this, the exterior of the head 2 may be rounded, as shown in Figures 3 and 4, so as to fit firmly into the back of the shoe at the counter. A suitable marker such as a tack 8 may be provided to facilitate alinement of the device with the top of the shoe at the rear. With the stick in this position and the tack 8 alined with the top of the back part of the shoe, the inside face of head 3 may be moved into position adjacent the forward end of the opening, as shown, and the opening length may then be read from scale 6 on blade 1, it being understood that the point of origin of scale 6 corresponds to the position of tack 8.

In order to facilitate comparison of the opening lengths 7 of shoes of various sizes, although of the same style and type, the present invention contemplates a movable scale 9 which may be embedded in a recess 11 in the back of blade 1.

As clearly shown in Figure 2, scale 9, being, in the embodiment shown, particularly adapted for comparison of opening lengths, is graduated in $\tfrac{5}{24}''$ (which is the size increment for the opening length dimension) and the various graduations are indicated with a number designating the shoe size. The scale 9 may be suitably mounted upon blade 1 as, for instance, upon a shank 12, extending through a slot 13 in the blade and terminating in a recess 14 in which a suitable clamping device, such as a screwhead 15, may move. With such a device, it is apparent that when a shoe is placed upon an opening in the manner illustrated in Figure 1, the scale 9 may be moved to a position whereat the size corresponding to the particular shoe shown is alined with the forward edge of head 3. This may be without regard to the actual length of the opening in inches. The stick may then be placed upon any other shoe of the same size and style and the opening length checked by simply moving head 3 into a position whereat its forward edge is alined with the graduation corresponding to the size of the shoe under consideration.

It will be understood that a scale similar to 9 but graduated in $\tfrac{1}{8}''$ may be provided on the inside of blade 1 for checking the overall length gradation of shoes or lasts.

In the embodiment illustrated in Figure 7 there is arranged, a plurality of scales 16, 17 and 18, each adapted to gauge or measure a different dimension of a shoe or shoe part. For instance, in the embodiment illustrated, scale 16 is adapted particularly for the measurement of the overall length of quarters or quarter patterns. Scale 17 is adapted for the measurement of vamp lengths, and scale 18 for the measurement of back heel heights. These dimensions are clearly illustrated in connection with Figures 5 and 6 where 170 shows, with relation to a typical vamp 19, the particular dimension which is herein referred to as the vamp length. In connection with a typical quarter 21, shown in Figure 6, there is illustrated the dimension 160 which is herein referred to as the overall quarter length, and the dimension 180 which is herein referred to as the back heel height.

As arranged in Figure 7, the blade of the measuring device may be multiple or in the form of a board 22 of sufficient width to accommodate a plurality of scales. Arranged adjacent one end of the board 22 is an abutment 23 which may be in the form of a shoulder extending entirely thereacross. Each of scales 16, 17 and 18 may be arranged with reference to a corresponding center line on board 22, and may be suitably mounted for movement back and forth along the center line. The scales 16, 17 and 18 may be embedded in suitable recesses such, for instance, as 26, 27 and 28 and provided with suitable clamping means, if desired, such as that shown in Figure 3.

As hereinbefore pointed out, scale 16 is adapted particularly for measuring dimension 160 and is, therefore, provided with major graduation $\tfrac{5}{24}''$ apart and minor graduations half way between the same, it being understood that $\tfrac{5}{24}''$ is the size increment for this particular dimension. Similarly scale 17 being adapted for measuring dimension 170, is provided with major graduations $\tfrac{1}{8}''$ apart and minor graduations therebetween corresponding to half sizes and scale 18 is graduated with major graduations $\tfrac{1}{16}''$ apart and minor graduations for half sizes.

The device illustrated in Figure 7 is particularly adapted for the measurement or grading of patterns and shoe parts and it will be understood that when a pattern for a particular lot of shoes, all being of the same type and style is received by a shoe manufacturer, he may place the sample pattern of, for instance, a size 4, upon the board and move scale 17 into the position whereat the 4 graduation thereon is alined, as illustrated, with the throat of the vamp. Having once adjusted the position of scale 17, the remaining patterns of the lot may then be placed in corresponding position and the throat lines thereof will, if they are properly graded, become alined with the respective size marks. Likewise, with scales 16 and 18 for grading dimensions 160 and 180 respectively of the quarters.

From the foregoing description, it is apparent that the present invention provides a shoe measuring or grading device wherein not only shoes or shoe parts, but also lasts and patterns, may be readily and accurately checked as to proper gradation or difference in dimensions in accordance with the size thereof. By thus graduating movable scales in accordance with size increments of particular shoe dimensions, it is apparent that such scales, when once set in accordance with a particular part will, while in that set position, properly indicate the dimension of parts of different sizes of the same style and type, and accordingly, it is necessary to set the device but once for each lot of shoes or shoe parts to be graded. Furthermore, it is unnecessary to compute from actual dimensions in order to determine whether or not the shoes or parts are properly graded as to size increments, but by merely placing the same upon the measuring device, improper gradation is readily apparent.

It is apparent that many modifications of the shoe measuring device hereinbefore described will present themselves to those skilled in the art without departing from this invention. It is to be distinctly understood, therefore, that the invention is not limited to the specific details of construction nor to the measurement of the particular dimensions hereinbefore referred for the purpose of illustration. Such modifications and the use of such individual features and subcombinations of features as do not depart from the spirit of this invention are, although not specifically described herein, contemplated by and within the scope of the appended claims.

Having thus described the invention, what is claimed is:

1. A measuring device for shoe parts comprising, a blade, an abutment on said blade, a scale mounted on said blade and movable therealong entirely within the confines thereof, said scale being graduated in shoe part size increments.

2. A measuring device for shoe parts comprising, a blade, an abutment fixed on said blade, a scale mounted on said blade and movable therealong entirely within the confines thereof, said scale being graduated in shoe part size increments, and a movable abutment slidable along said blade to cooperate with said scale.

ARTHUR J. BRAUER.